United States Patent [19]

Hill

[11] Patent Number: 4,802,599
[45] Date of Patent: Feb. 7, 1989

[54] ENGINE OIL COLLECTOR SYSTEM

[76] Inventor: Fred C. Hill, 585 Moyer Rd., Souderton, Pa. 18964

[21] Appl. No.: 73,559

[22] Filed: Jul. 15, 1987

[51] Int. Cl.⁴ .............. B65B 39/00; F16N 31/00; B65D 81/36
[52] U.S. Cl. .................... 220/1 C; 141/86; 141/98; 141/331; 141/340; 184/1.5; 184/106; 206/223
[58] Field of Search ............ 141/98, 86, 331-334, 141/340, 343, 339; 220/1 C, DIG. 6, 855 P; 206/223; 184/1.5, 106, 109; 215/1 C

[56] References Cited

U.S. PATENT DOCUMENTS

| Re. 27,449 | 8/1972 | Bartz | 141/1 |
|---|---|---|---|
| 1,903,300 | 4/1933 | Rollason | 220/85 SP |
| 1,974,132 | 9/1934 | Bennett | 220/85 SP |
| 2,866,582 | 12/1958 | Punte et al. | 220/85 SP |
| 3,997,703 | 12/1976 | Nakashio et al. | 215/1 C X |
| 4,010,863 | 3/1977 | Ebel | 220/1 C |
| 4,054,184 | 10/1977 | Marcinko | 189/1.5 |
| 4,149,575 | 4/1979 | Fisher | 141/98 |
| 4,296,838 | 10/1981 | Cohen | 184/106 |
| 4,301,841 | 11/1981 | Sandow | 141/98 |
| 4,403,692 | 9/1983 | Pollacco | 206/223 |
| 4,488,584 | 12/1984 | Hestehave et al. | 141/339 |
| 4,524,866 | 6/1985 | Pollacco | 206/223 |
| 4,533,042 | 8/1985 | Pollacco | 206/223 |
| 4,557,395 | 12/1985 | DeLay, Jr. | 141/98 X |
| 4,632,268 | 12/1986 | Melzi et al. | 220/1 C |
| 4,640,431 | 2/1987 | Harrison | 220/1 C |
| 4,658,974 | 4/1987 | Fujita et al. | 215/1 C |
| 4,673,081 | 6/1987 | Habig et al. | 206/223 |

FOREIGN PATENT DOCUMENTS 2351932 4/1975 Fed. Rep. of Germany ... 220/DIG. 6

Primary Examiner—Henry J. Recla
Assistant Examiner—Ernest G. Cusick
Attorney, Agent, or Firm—Caesar, Rivise, Bernstein, Cohen & Pokotilow, Ltd.

[57] ABSTRACT

A system for collecting used oil from an engine. The system includes a collector vessel, a drain pan which can be releasably mounted on the collector vessel, and a threaded sealing cap. For draining the oil, the collector vessel with the drain pan mounted thereon is placed below the drain plug of the engine. The drain pan includes a top wall in the form of a downward sloping recess having an outlet at its lowest point and a side wall at the periphery of the drain pan. The used motor oil is emptied into the drain pan and flows down the recess to the outlet into a communicating entrance mouth of the vessel. After the used oil has been drained from the engine, the drain pan is removed from the collector vessel and the threaded cap is used to seal the vessel's entrance mouth. The vessel also includes a handle for facilitating the transport of the vessel to a location for disposal of the used oil.

7 Claims, 2 Drawing Sheets

U.S. Patent　　Feb. 7, 1989　　Sheet 1 of 2　　4,802,599
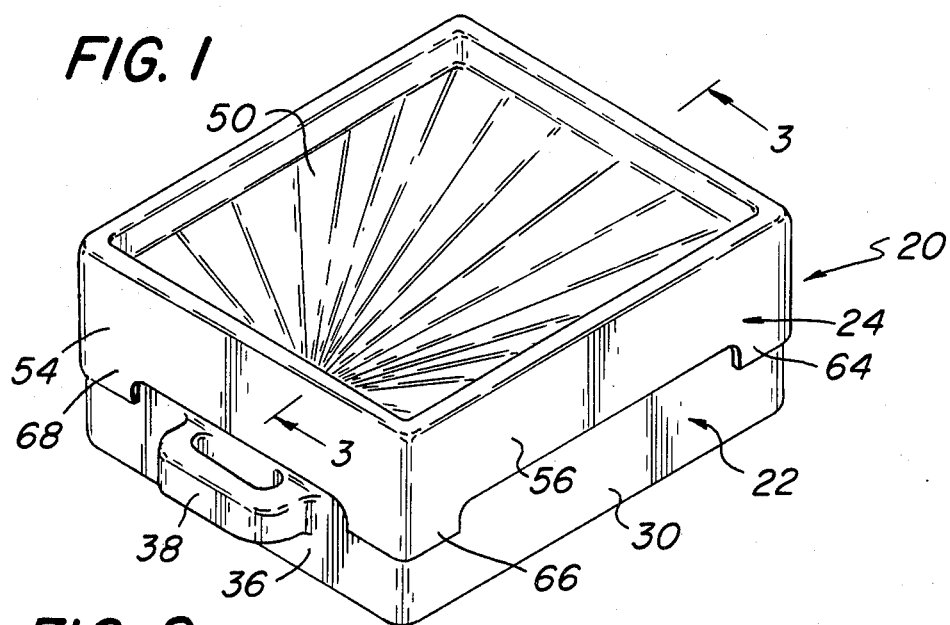
FIG. 1
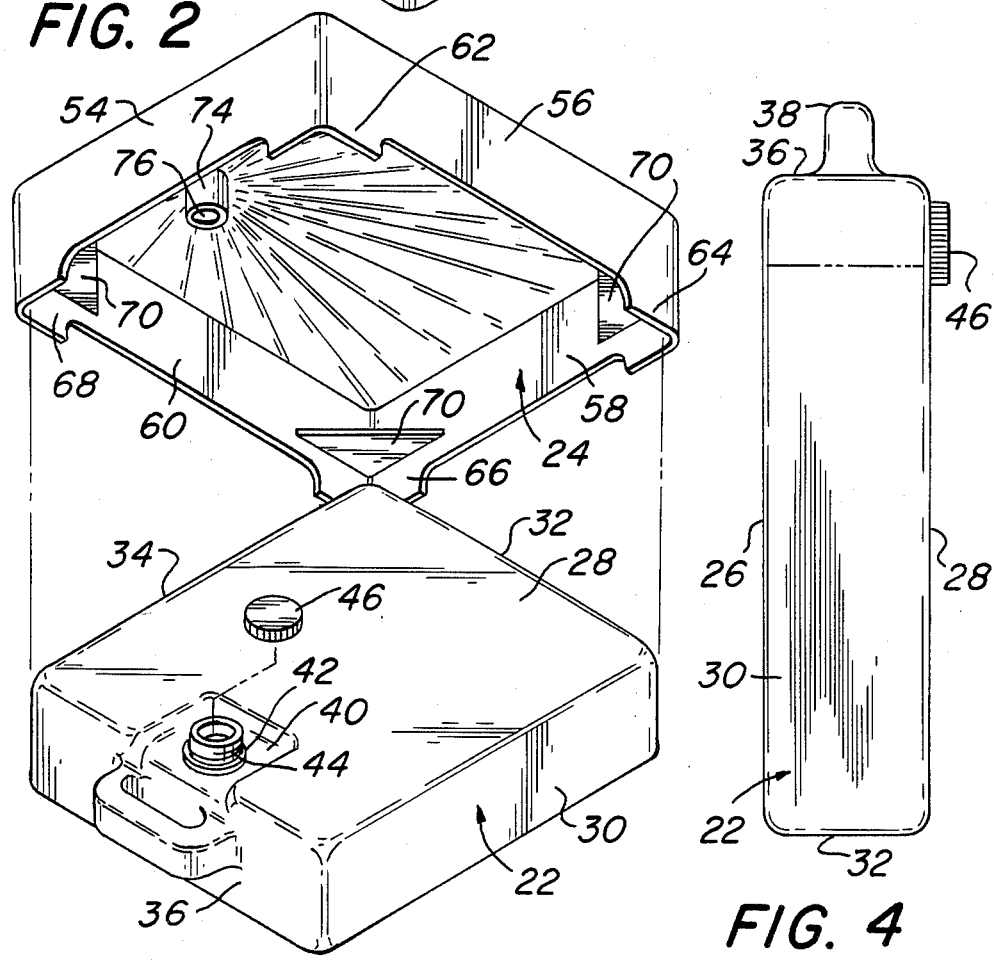
FIG. 2
FIG. 4

ENGINE OIL COLLECTOR SYSTEM

BACKGROUND OF THE INVENTION

This invention relates generally to receptacles and more particularly to a system for collecting used engine oil.

In order to collect used oil from an engine, such as an automobile engine, it has been a practice to place an open pan under the engine's oil outlet so that its oil can drain into the pan for subsequent disposal. This technique is obviously quite messy. There is commercially available a device for enabling the collection of used oil in a container. That device basically comprises a flattened, rectangularly shaped, hollow container having a funnel-shaped top wall to form a drain pan. At the lowest point in the top wall is a threaded opening onto which a threaded cap may be screwed. The device is arranged to be used as follows: with the cap removed the device is placed under the engine oil outlet so that the oil draining from the engine flows onto the funnel-shaped top wall, down that top wall and into the threaded opening into the interior of the container. The cap can then be screwed over the opening to prevent oil from getting out of the container. The container also includes a handle at one end thereof to enable it to be readily transported. This unitary drain pan-collector device is shown in U.S. Pat. No. Re. 27,449, and is sold by Gott Corporation, of Winfield, Kans.

While the unitary drain pan-collector device as described above is generally suitable for its intended purposes, it nevertheless exhibits various drawbacks. In this connection, as will be readily appreciated by those skilled in the art, some oil will necessarily remain on the surface of the funnel-shaped top wall after the bulk of the oil has been introduced within the container and sealed therein by threading the cap on the opening. This oil can soil the user's clothing if the container's top wall touches the clothing. In addition, the oil can drip onto the floor of the garage or other area in which the engine is located. Obviously, this presents a considerable drawback. Moreover, with the prior art container one cannot see how much oil is in the container. Due to this, it is impractical to try to change the oil from more than one car before the container is transported and emptied.

OBJECTS OF THE INVENTION

Accordingly, it is a general object of the subject invention to provide a system for collecting engine oil which overcomes the disadvantages of the prior art.

It is a further object of the instant invention to provide an engine oil collector system comprising oil directing means and a container which cooperate with each other.

It is a further object of the instant invention to provide an engine oil collector system which is simple in construction, low in cost and including portions that can be readily reused.

These and other objects of the instant invention are achieved by providing a system for collecting used oil from an engine comprising collector means, oil directing means, and sealing means. The collector means basically comprises a hollow vessel of a predetermined shape and having a bottom wall upon which the vessel is arranged to be disposed beneath the engine. The vessel also includes a top wall disposed opposite the bottom wall and at least one side wall interconnecting the top and bottom wall. The top wall also includes a sealable entrance mouth. The oil directing means basically comprises a drain pan including a top wall having a downward sloping recess including an outlet adjacent its lowest point. The drain pan is arranged to be releasably mounted on the collector vessel so that its outlet is in communication with the entrance mouth of the collector vessel, whereupon motor oil emptied into the drain pan flows down the recess thereof, through the outlet and the communicating entrance mouth into the vessel. The sealing means is arranged to seal the entrance mouth after the oil is located within the collector vessel and the drain pan has been removed therefrom.

BRIEF DESCRIPTION OF THE DRAWINGS

FIG. 1 is a perspective view of the oil collection system of this invention;

FIG. 2 is an exploded perspective view of the components forming the system shown in FIG. 1;

FIG. 4 is a side elevational view showing the container portion of the system of FIG. 1 after it has collected oil therein and is ready for transportation to a disposal site.

DETAILED DESCRIPTION OF THE PREFERRED EMBODIMENT

Figure 3:
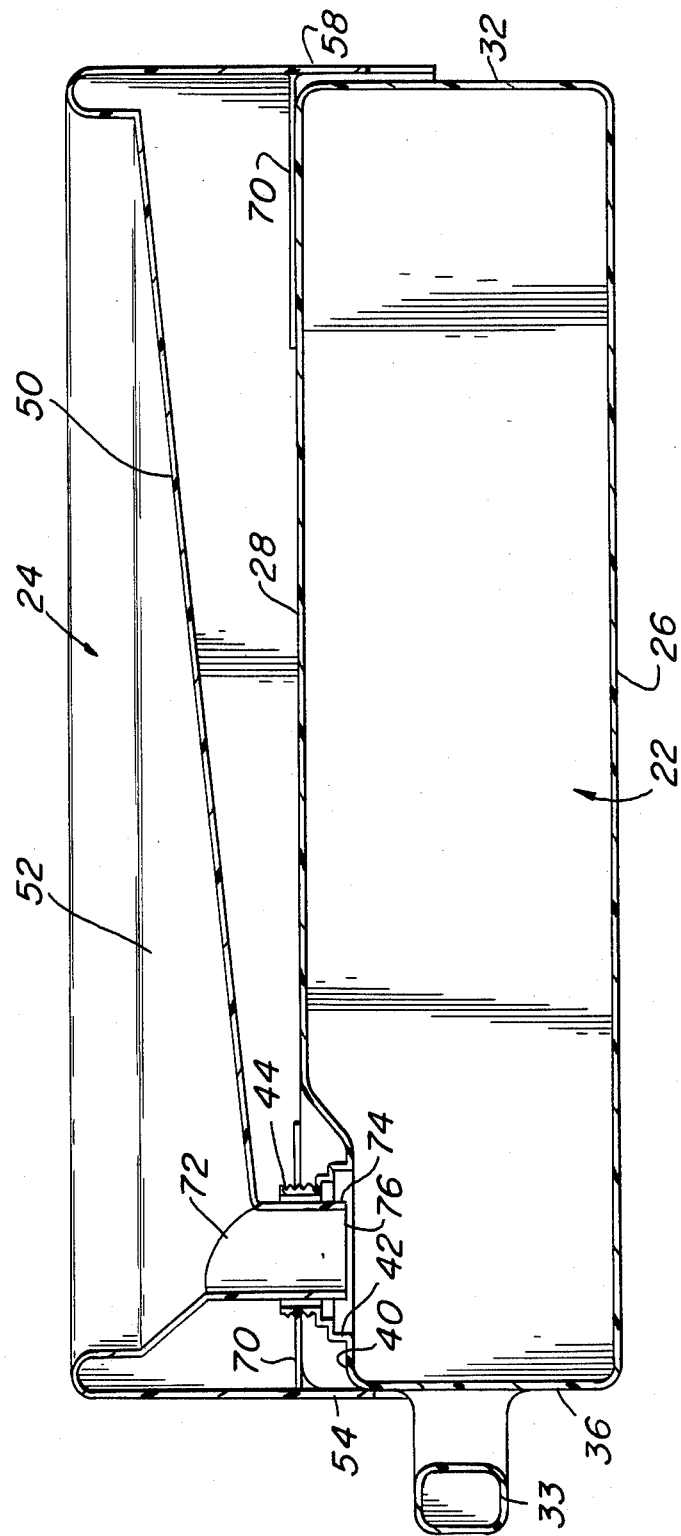
FIG. 3 is an enlarged sectional view of the system shown in FIG. 1 and taken along line 3—3.

Referring now in greater detail to the various figures of the drawing wherein like reference characters refer to like parts, there is shown at 20 in FIG. 1 a system for collecting used oil from an engine, such as an automobile engine (not shown).

The system basically comprises two components, namely, a collector vessel or container 22 and a cooperating drain pan 24.

The vessel 22, as can be seen clearly in FIGS. 2-4, basically comprises an generally rectangular, hollow body having a generally planar bottom wall 26 (FIG. 3), a generally planar top wall 28 (FIG. 3) and end walls 30 (FIG. 2), 32 (FIG. 3), 34 (FIG. 2), and 36 (FIG. 3) interconnecting the top and bottom walls. The wall 36 includes a handle 38 (FIG. 3) projecting outward therefrom. A generally planar recess 40 (FIGS. 2 and 3) is provided in the top wall 28 adjacent the handle 38. A threaded mouth 42 projects upward from the recess portion 40 to a height just slightly above the top wall 28. The threads on the mouth 42, are denoted by the reference number 44, and are adapted to be engaged by mating threads (not shown) on the interior of a cap 46 (to be described later).

In accordance with the preferred embodiment of the invention, the collector vessel 20 is preferably formed of a hard and tough plastic material, such as polyvinyl chloride, polyethylene, etc., and is preferably formed as an integral unit, such as by blow molding, injection molding, etc.

The cap 46 is also formed of a plastic material and can be of a construction like that found on conventional gallon milk containers.

The collector 22 is arranged to be disposed on the ground or some other surface under the engine from which oil is to be drained so that oil can be directed into its interior by the drain pan 24 (as will be described later). Once the oil is within the interior of the collector, the cap 46 is screwed onto the threads 44 to seal the oil therein. The oil can then be transported to some site at which the collector with the oil in it can be discarded.

Since the oil is contained within the collector, such action will not result in polluting the environment. The handle 38 serves as the means for enabling the ready transporting of the oil-filled collector 20.

In accordance with the preferred embodiment of the invention, the height of the collector, that is, the distance between its bottom wall 26 and its top wall 28 is approximately 3.5 inches (8.89 cms.), the length of the collector, that is the distance between its side walls 32 and 36, is approximately 14 inches (35.6 cms.), and its width, that is the distance between its side walls 30 and 34, is approximately 12 inches (30.5 cms.). The walls of the collector are approximately 0.02 inch (0.51 mm) thick. With such a construction, when the collector is filled with oil to approximately that of the recess 40, the collector will be holding 8.75 quarts of oil. Moreover, when the collector is oriented vertically, as is the case when it is carried by handle 38 and as shown in FIG. 4, the oil level will just reach the collector's threaded mouth 42.

The drain pan 24, as noted earlier, is arranged to cooperate with the collector 22 to facilitate the filling of the latter. To that end, the drain pan 24 is arranged to be mounted on the collector 22 disposed above its top wall 28 to direct any oil from the engine into the mouth 42 of the collector. Thus, as can be seen, the drain pan 22 basically comprises an upper wall 50 which is of sloped construction to define a recess 52, and about which is disposed four downwardly projecting side walls 54, 56, 58 and 60.

The side walls 54, 56, 58 and 60 are arranged so that the drain pan 22 is of rectangular profile and just slightly larger than the profile of the collector 22 so that it can be fit thereon, as will be described later. The drain pan 24 is preferably formed as an integral unit of a tough, opaque plastic, such as polyvinyl chloride, polyethylene, etc.

As can be seen clearly in FIG. 2, the corner at each of the side walls is in the form of a downwardly extending or projecting leg. Thus, a leg or foot 62 is provided at the bottom of the corner formed by the juncture of side walls 54 and 56, a similar leg 64 is provided at the bottom of the corner formed by the juncture of side wall 56 and 58, a similar leg 66 is provided at the bottom of the corner formed by the juncture of side walls 58 and 60, and a similar leg 68 is provided at the bottom of the corner formed by the juncture of side walls 60 and 54.

As can also be seen in FIG. 2, a triangular web or flange extends perpendicularly to the inner surfaces of the side wall forming each corner. The webs are all located at the same location with respect to the bottom edge of each of the legs 62–68 and serve as support brackets to hold the drain pan 24 in place over the container 20 when the container is to be filled.

As can be seen clearly in FIG. 3, the upper wall 50 of the drain pan 24 includes an opening or outlet 72 therein. The opening 72 is disposed at the lowest point in the recess 52 formed by the sloping wall 50 and is located close to the side wall 52. In order to form the recess 52, the upper wall 50 slopes from its juncture with its respective side walls down to the opening 72. The opening 72 is in the form of a downwardly extending tubular throat 74. The free end of throat 74 is opened at 76 (FIG. 2).

In accordance with the preferred embodiment of the invention, the drain pan 24 is also molded as an integral unit, such as by blow molding, injection molding, etc. The thickness of the material making up the walls of the drain pan is approximately 0.04 inch (1.02 mm). The spacing between the inner surfaces of the side walls 54, 56, 58 and 60 is such that the drain pan can be disposed over the collector 22 with the bracket forming webs 70 located on the upper wall 28 of the collector so that the drain pan cannot move thereon. When the drain pan is so disposed, its throat 74 extends into the threaded mouth 42 of the collector 22.

Use of the system 20 is as follows: the drain pan 24 is mounted on the collector as just described and the combination is then disposed horizontally under the engine whose oil is to be drained. The engine oil thus can flow out of the engine and into the recess 52 of the drain pan, whereupon it flows down the sloping top wall 50 into opening 72, through throat 74 and its outlet 76 into the interior of the container 22. Once all the oil has been drained from the engine and has flowed down the top wall of the drain pan into the container, the drain pan can be removed from the container. The cap 46 is then screwed onto the mouth 42 of the container and the container carried away for disposal. The drain pan can then be cleaned and ready for reuse with another collector 22, or with the original collector, if the oil had been disposed therefrom and the collector retained.

In accordance with the preferred embodiment of the drain pan, its height, that is the distance from its bottom edge to its top edge is approximately four inches (10.2 cm.), the flanges 70 are approximately two inches (5.1 cm.) above the bottom edge of the drain pan and the opening 72 is approximately two inches (5.1 cm.) below the top edge of the pan. The outside diameter of the throat portion 74 is approximately one inch (2.54 cm.) to fit readily within the interior of throat 42 of the container 22.

It should be noted that the plastic forming the container is preferably either transparent or translucent to enable one to readily see the amount of oil collected therein.

As should be appreciated by those skilled in the art, the oil collection system of the subject invention has three significant advantages over the unitary drain pan-collector of the prior art. In this connection, as noted earlier, the prior art system by utilizing a combination of an integral drain pan and container, necessitates the cleaning of the drain pan portion before transporting the captured oil in order to prevent any drippage or soiling of clothing or the ground. In contradistinction, the two-piece construction, namely, the separate pan and collector of the subject invention, enables one to lift the pan off of the container and the container with the oil sealed therein can then be transported without any mess. Also, with the prior art unitary drain pan-collector one must transport the oil somewhere to be emptied out from the container, if the drain pan is desired to be reused. That action necessitates the reuse of the entire device, so that the oil will have to be emptied from the container. With the subject invention, one can either reuse the container or just dispose of it with the captured oil inside. Thus, it is contemplated that the subject system be marketed with a reusable pan and a disposable container(s), and with other containers available for purchase for use with the drain pan. Lastly, the system of the prior art is of limited use in that one can only change the oil in one car until the container is emptied for reuse, because you cannot see the oil level inside the container. In contradistinction, the invention of this application, by virtue of the fact that one can use additional containers with the drain pan, enables one to change the oil in more than one car at a time.

Thus, the subject system offers a clean, efficient and low-cost way of collecting and disposing of used oil.

Without further elaboration, the foregoing will so fully illustrate my invention that others may, by applying current or future knowledge, adopt the same for use under various conditions of service.

I claim:

1. A reusable system for collecting used oil from an engine comprising collector means, oil directing means, and sealing means, said collector means comprising an enclosed hollow collector vessel of a predetermined shape and having a bottom wall upon which said vessel is arranged to be disposed beneath said engine, a top wall disposed opposite said bottom wall and having a sealable entrance mouth therein, and at least one side wall interconnecting the top wall and the bottom wall, said oil directing means comprising a drain pan with a lowest point and including a top wall forming a downward sloping recess having an outlet adjacent its lowest point, said drain pan being arranged to be releasably mounted upon said collector vessel during oil drainage, whereupon its outlet is in communication with the entrance mouth to said collector vessel so that oil emptied into said drain pan flows down the recess thereof, through said outlet and said communicating entrance mouth into said vessel, said sealing means comprising a sealing cap to seal said entrance mouth after the oil is located within said collector vessel and said drain pan has been removed therefrom, and said collector vessel may be transported to a disposal location, said top and bottom walls of said collector vessel each being generally planar, with said collector vessel top wall having a recess therein from which an annular neck projects upward to an elevation just slightly higher than said collector vessel top wall, said annular neck forming said entrance mouth and having helical threads disposed thereabout, said cap including threads for mating with said threads on said entrance mouth, said recess allowing said annular neck to be of sufficient length for said outlet to nest securely within said annular neck to provide stability when said drain pan is mounted on said collector vessel and said recess providing that only a small portion of said annular neck protected by said cap projects beyond said top wall of said collector vessel when said collector vessel is transported to a disposal location.

2. The oil collecting system of claim 1 wherein said collector vessel includes handle means for holding said vessel secured thereto.

3. The oil collecting system of claim 1 wherein said collector vessel and said drain pan are each formed of a plastic material.

4. The oil collecting system of claim 3 wherein said collector vessel is transparent or translucent to enable one to see the amount of oil located therein.

5. The oil collecting system of claim 1 wherein said collector vessel is transparent or translucent to enable one to see the amount of oil located therein.

6. The oil collecting system of claim 1 wherein said drain pan includes a bracket means disposed below said recess and adapted to rest on the top wall of said container vessel, said drain pan also including a side wall adapted to fit over said at least one side wall of said collector vessel when said drain pan is releasably mounted on said vessel to prevent the lateral shifting thereof.

7. The oil collecting system of claim 6 wherein said collector vessel, said drain pan, and said cap are each formed of a plastic material.

* * * * *